July 9, 1946.	G. E. HOLTON ET AL	2,403,799

TENSIOMETER

Filed April 28, 1945

INVENTORS.
GEORGE E. HOLTON,
CARL E. HEGLUND &
BY JAMES V. MANSON

Parker & Burton
ATTORNEYS.

Patented July 9, 1946

2,403,799

UNITED STATES PATENT OFFICE 2,403,799

TENSIOMETER

George E. Holton, Carl E. Heglund, and James V. Manson, Jackson, Mich., assignors to Hinckley-Myers Division of Kent-Moore Organization, Inc., Jackson, Mich., a corporation of Michigan Application April 28, 1945, Serial No. 590,768

3 Claims. (Cl. 73—144)

This invention relates to improvements in cable tensiometers.

An object is to provide a simple, rigid, easily operable cable tensiometer through the use of which the tension imposed upon a cable may be quickly and accurately determined in order that the cable tension may, if necessary, be properly adjusted.

Such an instrument is particularly adapted for use in the aircraft industry to determine the tension upon the various cables which form a part of aircraft. The instant tensiometer belongs to that class of tensiometers wherein a length of the tensioned cable to be tested is supported upon a pair of spaced apart anvils or cable seats and mechanism is provided to deflect such length of cable against its tension between such anvils to measure the tension imposed upon the cable.

An object of the invention is to provide an instrument which exhibits a pair of spaced apart outwardly facing anvils adapted to span a section of the tensioned cable to be tested, which instrument includes means adapted to exert a substantially constant pressure inwardly upon the span of cable extending between the anvils to deflect the cable inwardly between the anvils a distance which is a function of the tension imposed upon the cable, and which instrument further includes a gage provided with a plunger which is yieldingly held outwardly toward the interval between the anvils and which plunger is depressible inwardly of the anvils in response to deflection of the cable to register on the gage the measure of the deflection of the cable under the constant pressure exerted thereupon.

The gage readings indicated by the actuation of the plunger may be in any desired increments of measurements of cable deflection such as thousandths of an inch. A table is provided by which the various deflection readings may be translated into tension measured in pounds. A particular instrument is accurately operable over a determined range of cable tension and with a limited number of cables of different diameters. For example, a single instrument may be accurately operable with cables varying in diameter from $\frac{1}{16}$ to $\frac{1}{4}$ of an inch and tensioned over a range varying from 10 pounds to 300 pounds.

A meritorious feature resides in the provision of an instrument which exhibits a pair of outwardly facing spaced apart cable seats and includes cable deflecting means which is spring urged under a substantially constant pressure inwardly toward the interval between said seats to deflect a length of tensioned cable bridged across said seats and which instrument includes gage mechanism having a plunger spring urged outwardly toward the interval between said cable seats which plunger is responsive to the deflection inwardly of the cable to register on the gage the extent of such deflection.

The cable deflecting means which is spring urged inwardly toward the interval between said seats includes a swingable handle to be actuated plier like relative to a fixed handle of the instrument to withdraw the cable contacting part of said means away from the section of cable bridged across said seats to permit the instrument to be engaged with or disengaged from a cable.

The instrument is so constructed that when a deflection measurement is taken, if the dial of the instrument is disposed so as not to be visible for reading the dial, the indicator may be temporarily locked in position and the instrument removed from the cable to a position at which the dial is visible for reading.

Other objects, advantages and meritorious features will more fully appear in the following description, appended claims and accompanying drawing wherein:

Figure 1 is a front elevation of the improved tensiometer held open to receive a cable, Fig. 2 is a rear elevation of the same tensiometer showing the cable deflected.

Fig. 3 is a sectional view taken on line 3—3 of Fig. 2,

Fig. 4 is a sectional view taken on the line 4—4 of Fig. 2,

Fig. 5 is a sectional view taken on the line 5—5 of Fig. 1,

Fig. 6 is a fragmentary elevation of the structure shown in Figure 5 with the spring catch released.

The tensiometer comprises a frame 10 having a fixed handle 12 at one end and a pair of spaced apart outwardly facing V-notched anvils or seats 14 at the opposite end. The body of the frame is provided with an intermediate web 16 which with the margin of the frame forms a recess or pocket on each side of the web as shown in Figures 3 and 4.

Within the pocket on one side of the web is seated a conventional dial indicator 18. A face plate 20 is secured by screws 22 or the like to the frame on this side and is cut out to encircle the dial indicator as shown in Figures 1 and 3.

The dial indicator is provided with a plunger 24 which is held outwardly by spring pressure toward the interval between the cable seats 14 as shown in Figure 1. The face of the dial is graduated as illustrated to register in thousandths of an inch the inward depression of the plunger from its zero setting. The plunger when held outwardly is adapted to engage a cable seated upon the seats 14 and as this cable is deflected the inward movement of the plunger will be indicated on the dial in the particular graduated measurements shown on the dial.

Means is provided to deflect a section of cable bridged across the seats 14 which means is here illustrated in the form of a handle 26 pivoted at 28 to a portion 30 of the frame that overhangs one of the anvils. This handle is provided with a cable engaging part or hammer 32 which is so disposed as to overhang the cable stretched between the anvils as shown in Figure 2. The frame is cut away as illustrated in Figure 2 and this handle swings through the recess on the opposite side of the web 16 from the dial 18.

The handle 26 is held normally by tension springs 34 connected at one end with the handle and at the opposite end with the frame so that the hammer 32 engages and deflects a cable stretched between the anvils. This swinging handle therefore is adapted to exert a substantially constant spring pressure upon a cable engaged by the device. The response of the cable in distance of deflection will depend upon its resistance to deflection. The deflection of the cable under the constant spring pressure is measured on the dial 18 which may be graduated in thousandths of an inch. A face plate 36 is secured by screws 38 or the like to the frame 10 over the recess within which the springs and handle portion are disposed and this face plate has associated therewith a table or scale 40 shown in Figure 2.

When the deflection of the cable is read on the dial in thousandths of an inch this may be translated into tension measured in pounds for any particular cable shown on the table 40. It will be noted that this table in the left-hand column indicates cable diameters varying from 1/16 to 1/4 of an inch. The top horizontal row of the figures indicates tension in pounds while the squares in the horizontal rows opposite each cable diameter indicate deflection figures for a cable of that diameter when tensioned to the number of pounds indicated at the head of the column. It is therefore possible to translate the deflection readings for any diameter of cable indicated on the table into pounds tension. Any single instrument is capable of taking care of a certain number of cables of a determined range of diameters and where the tension also comes within a determined range.

In some cases readings might have to be taken with the instrument where it would not be possible to read the figures on the scale while the instrument was engaged with the cable. There has therefore been provided a spring catch arrangement which is adapted to engage the plunger 24 at any particular point and maintain it releasably at such position. This spring catch arrangement is shown in Figures 5 and 6. A sleeve 42 is secured about the portion 25 of the dial stem which surrounds the plunger 24 and this sleeve has a pair of opposed overhanging fingers 44. A dual leaf spring device has a disk shaped portion 46 secured underneath the fingers 44 and is rotatable about the plunger 24. To the disk 46 there is secured an upper leaf 48 which is normally held upwardly as shown in Figure 6. This leaf 48 has a handle 49. The upper leaf 48 is cut away at 52 and the spring catch may be rotated about the plunger so as to permit release of the portion 48 by the fingers 44 so that such portion 48 will snap upwardly and exert a frictional pressure against the plunger 24 to hold it at adjusted position. The plunger 24 is actuated by a very light spring pressure within the gage itself. It is also apparent that the spring catch device may be so rotated that the part 48 may be held underneath the fingers 44 so as to permit free reciprocal movement of the plunger 24.

What we claim is:

1. A tensiometer device comprising, in combination, a frame having on one side thereof a pair of spaced apart extensions each provided with an outwardly facing cable engaging anvil on the end thereof, an arm pivoted to one of said extensions to one side of the anvil thereof and carrying a hammer-like part swingable with the arm into and out of the interval between said anvils and in the plane thereof, spring means coupled to said frame and to said arm urging the latter in the direction to cause said part to enter the interval between said anvils and deflect a cable section extending therebetween, a gauge carried by said frame having an outwardly urged spring pressed plunger adapted to bear against a cable section extending between the anvils on the side of the cable section opposite said part and transmit to said gauge the extent of deflection of the cable section, and a pair of plier-like handles on the side of the frame opposite said extensions, one connected to said frame and the other to said arm, so arranged relative to one another that when gripped and compressed together by a hand against the tension of said spring means the hammer-like part is swung out of said interval to release the cable section.

2. A tensiometer device comprising, in combination, a frame having a pair of spaced apart extensions each carrying an outwardly facing cable engaging anvil on the end thereof, an arm pivoted to said frame and provided with a hammer-like part swingable therewith into and out of the interval between said anvils and in the plane thereof, spring means coupled to said frame and to said arm urging the latter in the direction to cause said hammer-like part to enter said interval and deflect a cable section against which said anvils bear, a pair of plier-like handles, one connected to said frame and the other to said arm, so arranged relative to one another that upon being squeezed together by a hand against the tension of said spring means the hammer-like part is swung out of said interval to free the cable section deflected thereby, a gauge carried by said frame having an outwardly urged spring pressed plunger adapted to bear against a cable section extending between said anvils on the side of the cable section opposite said part and transmit to said gauge the extent of deflection of the cable section, and means manually operable to releasably lock said plunger in any adjusted position and thereby retain the reading of said gauge regardless of the freeing of the cable section by said part.

3. A tensiometer comprising, in combination, a frame exhibiting a pair of spaced apart cable seats adapted to receive a cable section extending therebetween, cable deflecting means carried by said frame having a part normally urged under substantially constant pressure against a cable section extending between said seats, a gauge carried by said frame having a spring urged plunger adapted to bear against the cable section extending between said seats and transmit to the gauge the extent of deflection of the cable section, means yieldingly urged into engagement with said plunger to lock the same in any adjusted position regardless of the removal of the cable section from said seats, and means normally holding said last means out of engagement with the plunger but manualy operable to release the same for engagement therewith.

GEORGE E. HOLTON.
CARL E. HEGLUND.
JAMES V. MANSON.